United States Patent [19]

Provasnik

[11] 4,276,775
[45] Jul. 7, 1981

[54] TEMPERATURE SENSOR FOR MEASURING THE TEMPERATURE OF A PART OF AN AUTOMOBILE

[75] Inventor: Robert Provasnik, Holland, Pa.

[73] Assignee: Siemens Corporation, Iselin, N.J.

[21] Appl. No.: 94,439

[22] Filed: Nov. 15, 1979

[51] Int. Cl.³ .......................... G01K 1/08; G01K 7/22
[52] U.S. Cl. ................................ 73/346; 174/DIG. 8
[58] Field of Search ........................... 73/346, 343 R; 339/29 B; 320/25; 338/22 R, 28

[56] References Cited

U.S. PATENT DOCUMENTS

| | | | |
|---|---|---|---|
| 1,692,301 | 11/1928 | Heslewood | 73/346 |
| 2,141,759 | 12/1938 | Moffat | 73/343 R X |
| 2,279,846 | 4/1942 | Stapleton | 73/343 R |
| 3,085,187 | 4/1963 | Godshalk | 320/25 |
| 3,199,348 | 8/1965 | Salera | 338/28 |
| 3,260,114 | 7/1966 | Drolet, Jr. | 73/362 AR |
| 3,302,107 | 1/1967 | Flaugher et al. | 73/117 X |
| 3,488,431 | 1/1970 | Nixon | 174/DIG. 8 |
| 3,779,079 | 12/1973 | Snook | 73/346 |
| 3,822,598 | 7/1974 | Brothers et al. | 73/362 AR |
| 3,919,680 | 11/1975 | Ueno et al. | 338/28 |
| 4,145,648 | 3/1979 | Zender | 339/29 B |
| 4,166,451 | 9/1979 | Salera | 73/362 AR |

FOREIGN PATENT DOCUMENTS 610241 6/1979 U.S.S.R. ................ 307/10 BP

Primary Examiner—Daniel M. Yasich
Attorney, Agent, or Firm—Spellman, Joel & Pelton

[57] ABSTRACT

A temperature sensor for measuring the temperature of a part of an automobile, which sensor comprises in combination a clip and an electric heat-sensitive device, such as preferably a thermistor. The clip, which attaches the sensor to the automobile part, includes a first and a second jaw. These jaws are movable between a first and a second position. In the first position, the jaws are remote from each other, whereas in the second position they are positioned close to each other. In the first jaw, there is provided a recess adjacent to the second jaw. A heat-sensitive device is retained within this recess by a heat-conductive material. The automobile part, the temperature of which is to be determined, is enclosed between the jaws when the clip is in its second position.

3 Claims, 4 Drawing Figures

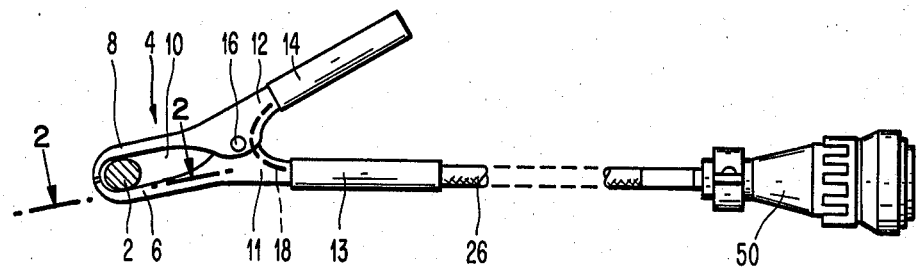
FIG. 1
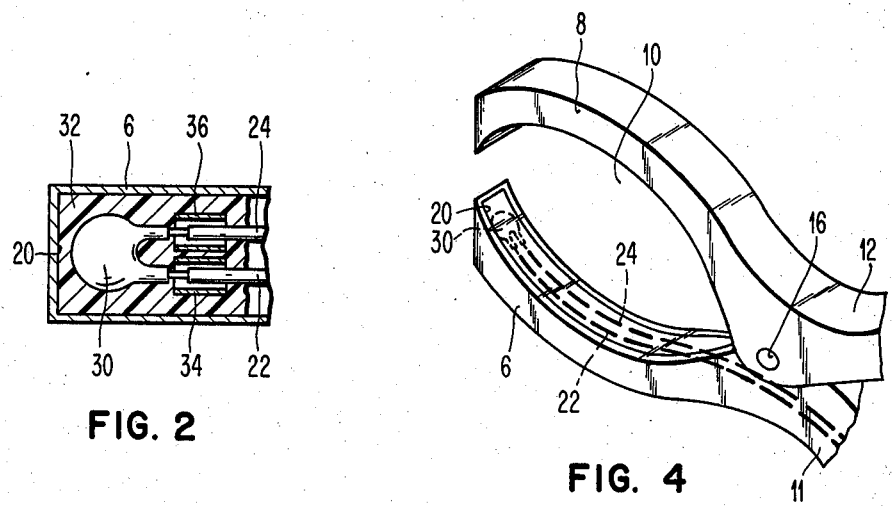
FIG. 2
FIG. 4
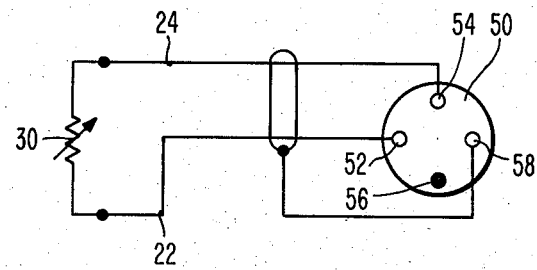
FIG. 3

TEMPERATURE SENSOR FOR MEASURING THE TEMPERATURE OF A PART OF AN AUTOMOBILE

BACKGROUND OF THE INVENTION

1. Field of the Invention

This invention relates to a novel and improved temperature sensor for measuring the temperatures of a part of an automobile, particularly of a part associated with an internal combustion engine. More particularly, this invention relates to a temperature sensor which is not installed permanently, but which can readily be attached to and removed from the automobile part. Still more particularly, this invention relates to a temperature sensor which can be used as a temperature probe of an automotive engine analyzer.

2. Description of the Prior Art

In the field of automotive engine analysis, it is necessary to measure various temperatures, such as the engine block temperature, the engine oil temperature and other temperatures of parts and operations directly associated with the engine block. However, it is also necessary to measure the temperature of various subsystems or accessories of the automotive engine, such as the air conditioner temperature and the air pump temperature. For the purpose of temperature measurement, there is needed a temperature sensor or probe which can easily be attached to and removed from the engine or the part considered. The sensor or probe should also provide an accurate temperature reading. Therefore, good heat-conductivity and good heat transfer between the part considered and the sensor is required. There are various ways to attach a temperature probe to the engine block or its parts. Devices which are used in automotive analysis include washer type bolt-on units, cartridges, etc. From U.S. Pat. No. 3,302,107, FIGS. 16-18a, it is known to insert a temperature sensor through the oil dipstick tube into the engine oil. These devices are sometimes not very easy to handle; the reading requires some time and is often not very accurate.

SUMMARY OF THE INVENTION

1. Objects

An object of this invention is to provide a temperature sensor for easily measuring the temperature of a part of an automobile.

Another object of this invention is to provide a temperature sensor for measuring the temperature of a part of an automobile, which sensor can easily and quickly be attached to and removed from the engine.

Another object of this invention is to provide a temperature sensor which is comparatively small and compact and allows for fast and accurate temperature readings.

Another object of this invention is to provide a temperature sensor which can be used for repeated measurements under rough environmental conditions.

Another object of this invention is to provide a temperature sensor which is very well suited for automotive garages and repair shops, particularly in connection with an automotive engine analyzer.

2. Summary

According to this invention, a temperature sensor for measuring the temperature of a part of an automobile comprises a clip for attachment to said automobile part and a heat sensitive device. The clip has a first and a second jaw. These jaws are movable between a first and a second position. In the first position the jaws are remote from each other, and in the second position, the jaws are close to each other, thereby enclosing said part. There is provided a recess in the first jaw, said recess being positioned between the jaws or facing the second jaw. The heat-sensitive device, such as a thermistor, has electrical leads. The device is retained within the recess of the first jaw by a heat-conductive material such as an epoxy.

According to a preferred embodiment of the invention, the recess extends completely along said first jaw, and said electrical leads are arranged within said recess. Preferably the clip comprises two handles, one of these handles having an opening therethrough for leading at least one electrical connecting lead therethrough to the heat-sensitive device.

According to another preferred embodiment, the temperature sensor further comprises an electrical cable having electrical connecting leads. The leads from said heat sensitive device are electrically connected to connection points, which are arranged within said recess and which are embedded in the epoxy. The connecting leads of the cable are also electrically connected to the connection points. In this embodiment, the usually very thin leads of the heat sensitive device are electrically connected to the comparatively thick leads of the electric cable in a reliable manner.

BRIEF DESCRIPTION OF THE DRAWINGS

The foregoing and other objects, features and advantages of the invention will be apparent from the following more particular description of preferred embodiments of the invention as illustrated in the accompanying drawings.

In the drawings:

FIG. 1 is a general view of a temperature sensor for measuring the temperature of a part of an automobile engine;

FIG. 2 is an enlarged sectional view of the tip of the lower jaw of the temperature sensor through II—II of FIG. 1;

FIG. 3 is an isometric view of the front part of the clip shown in FIG. 1; and

FIG. 4 is a representation of the electrical circuit which is used in the temperature sensor of FIG. 1.

DESCRIPTION OF THE PREFERRED EMBODIMENTS

With reference to FIGS. 1-3, a temperature sensor is shown which can be used as part of an engine analyzer to measure the temperature at various locations and parts of an automotive engine and its accessories, such as air conditioners or air pumps. Particularly, the sensor shown in the drawings has been found useful to measure the temperatures of such parts by attachment to bolt heads, metal rods, metal tubes, etc.

The temperature sensor comprises a clip 4 for mechanical attachment to any part 2 of an automobile where a temperature reading is desirable. Part 2 may represent either a rod or tube in an automobile, for instance, a tube which contains air, water or oil. By measuring the temperature of part 2, the temperature of the fluid can be detected.

For the purpose of mechanical attachment to part 2, the temperature sensor comprises a clip 4 which has a first or lower jaw 6 and a second or upper jaw 8. These jaws 6 and 8 are curved so as to form a space 10 therebetween. In operation part 2 lies within this space 10.

The first jaw 6 extends to a first elongated handle 11, and the second jaw 8 extends to a second elongated handle 12. The clip 4 is preferably made of a material of good heat-conductivity, such as copper. To protect the operator, the handles 11 and 12 have covers 13 and 14, respectively, which are made of a known heat-insulating material. Such materials may be silicon rubber or Teflon. The covers 13 and 14 are molded on. They serve for heat insulation and protection from the air blast of the engine fan. The covers 13 and 14 do also provide some measure of protection from rough handling in a repair facility.

The clip 4 can be operated by pivoting the handles 11 and 12 about an axis 16. Thus, the jaws 6 and 8 are movable between a first or open position (FIG. 3), in which they are positioned remotely from each other, and a second or closing position (FIG. 1), in which they are positioned close to each other. In the second position the jaws 6 and 8 enclose the part 2 of the equipment or apparatus such as the automobile under test. A spring 18 (see FIG. 1) in the clip 4 forces the jaws 6 and 8 towards the second position, in which the ends thereof tend to close.

An important feature of the lower jaw 6 is that it has a recess 20 (see FIGS. 2 and 3) therein. This recess 20 is formed along the longitudinal axis of the jaw 6 and faces the jaw 8. The recess 20 is continued in the first handle 11. The recess 20 has the form of an open canal with thin wall portions. Jaw 6 and handle 11 thus can be made of a curved piece of metal. Instead of a recess in the first handle 11, there could also be arranged an opening of a different form, as for instance, a bore. Recess and opening serve to permit passage therethrough for two electrical connecting leads 22 and 24 of an electric cable 26. One of the leads 22 and 24 could be replaced in FIG. 2 by an electric path via the lower jaw 6, which is electrically conductive.

The recess 20 contains an electric heat-sensitive device 30, preferably a temperature sensitive resistor or thermistor, which is of small size. The electric resistance of a thermistor varies according to the temperature to which it is exposed. Instead of a thermistor, a different but known temperature sensitive device can be used which in any event develops a voltage in accordance with or dependent upon the temperature applied.

In the recess 20, which serves for protection purposes, the heat sensitive device 30 is arranged close to part 2 to obtain true temperature readings. Thus, it may be arranged in the middle part, or alternatively, as can be seen in FIGS. 2 and 3, in the front part of the first jaw 6. The heat sensitive device 30 has two electrical leads which extend along the longitudinal axis of the jaw 6 and towards the first handle 11.

The heat-sensitive device 30 is retained within the recess 20 by a heat-conductive material 32, which is shown in FIG. 2 by scoring or hatching. The jaw 6 and the heat-conductive material 32 form a flat surface adjacent to the part 2. Thus the jaw 6 will hold the heat-sensitive device 30 close to the part 2 of the automobile where it is desired to measure temperatures. Due to the heat-conductive material 32, there is essentially no temperature difference between the part 2 and the heat-sensitive device 30.

Preferably a small thermistor can be cemented with any of the well-known heat-conductive epoxys such as Wakefield epoxy, Deltabond 152. The thermistor is the actual temperature sensing element. Its resistance and thereby the temperature can be determined by known means, for example, in a Wheatstone bridge.

As shown in FIG. 2, the electrical contact between the heat sensitive device 30 and the cable 26 is formed within the recess 20. The leads of the heat-sensitive device 30 are connected to two connecting points. The connecting leads 22 and 24 of one end of the cable 26 are also connected to these connecting points. Preferably, the connection may be made by soldering. The connection points are embedded in the epoxy 32. This permits the convenient connection of the usually very thin leads of the device 30 to the leads 22 and 24, which are usually of much larger diameter. Preferably the solder joints or connecting points are covered with heat-shrink tubings 34 and 36. At the other end of the cable 26 there is a connector 50 of conventional type.

It is desirable to have not only the handles 11 and 12 covered with a molded covering of an insulating material, but also other parts of the clip 4. This covering should be, of course, not applied to the heat-conductive area inside of the jaws of the clip 4. As shown in FIG. 3, the connector 50 has two measuring pins 52 and 54, a key pin 56 and a shield pin 58. The shield pin 58 is connected to an electric shield which shields leads 22 and 24 of cable 26.

The temperature sensor shown in FIGS. 1-3 may be assembled as follows: After soldering the leads of the heat-sensitive device 30 to the leads 22 and 24 of cable 26, respectively, the connection points are covered with the heat-shrink tubings 34 and 36, respectively. This device/cable assembly is then bonded to the jaw 6 of clip 4, using the heat-conductive epoxy, so that the cable 26 is also retained by the epoxy. Heat-shrinking is known in the art. In FIG. 2 the tubings 34 and 36 are shown after heat-shrinking.

The temperature sensor is rugged and thus very well suited to use in automotive garages and repair shops. The clip retention facilitates attachment and subsequent removal. Due to the small mass, the temperature sensor has very little heat-sinking effect, thus providing for fast measuring times. The covering of the clip 4 with an insulating material provides thermal insulation and impact protection during any rough treatment it may receive during use, for instance, in repair facilities.

The described clip-type construction lends itself to easy attachment to bolt heads, rubber tubing, aluminum or steel tubing, etc., i.e. whenever it becomes necessary to measure the temperature of a part of an automobile.

While the form of the heat-sensing device herein described constitutes a preferred embodiment of the invention, it is to be understood that the invention is not limited to this precise form of assembly, and that a variety of changes may be made therein without departing from the scope of the invention.

What is claimed is:

1. In an automotive testing device having an easily removable temperature sensor for selectively measuring the temperature of various parts of an automobile, comprising:
   (a) a clip for attachment to a selective one of said automobile parts, said clip having a first and a second curved jaw to more accurately measure the temperature, said jaws being movable between a first position, in which the jaws are positioned remote from each other, and a second position, in which the jaws are positioned close to each other, thereby enclosing said automobile part;

(b) an extended recess extending along said first jaw and facing said second jaw;

(c) a thermistor having electrical leads, said thermistor being retained within said recess by a heat-conductive material and said electrical leads being arranged in said recess;

(d) first and second handles connected to the first and second jaw, respectively, wherein said first handle has a longitudinal axis and an opening formed along said axis for leading at least one electrical connecting lead therethrough; and (e) an electric cable having at least one electrical connecting lead, wherein at least one of said leads from said thermistor is electrically connected to a connecting point being arranged within said recess, and wherein said connecting lead of the cable is conducted through said opening in said first handle and along said first jaw and is electically connected to said connection point, whereby the electric cable is adapted to be detachably connected to a remote temperature indicating device.

2. The temperature sensor according to claim 1, including a heat-shrink tubing, wherein said connection point is covered with said tubing.

3. The temperature sensor according to claim 1, wherein said jaws are covered with a heat insulating material, thereby leaving open said recess.

* * * * *